(12) United States Patent
Urabe et al.

(10) Patent No.: US 7,890,974 B2
(45) Date of Patent: Feb. 15, 2011

(54) EPG GENERATION APPARATUS, AND EPG GENERATION METHOD

(75) Inventors: Hirofumi Urabe, Kawasaki (JP); Kazuhiro Matsubayashi, Yokohama (JP); Kazuna Maruyama, Fuchu (JP); Koji Mito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 641 days.

(21) Appl. No.: 11/875,635

(22) Filed: Oct. 19, 2007

(65) Prior Publication Data
US 2008/0098429 A1 Apr. 24, 2008

(30) Foreign Application Priority Data
Oct. 24, 2006 (JP) ............................. 2006-289195

(51) Int. Cl.
*G06F 3/00* (2006.01)
(52) U.S. Cl. ............................. 725/39; 725/37; 725/40; 725/44; 725/52
(58) Field of Classification Search .................. None
See application file for complete search history.

(56) References Cited

U.S. PATENT DOCUMENTS

| | | | | |
|---|---|---|---|---|
| 2003/0106060 | A1* | 6/2003 | Inoue | 725/56 |
| 2004/0148629 | A1* | 7/2004 | Shibamiya et al. | 725/53 |
| 2005/0022236 | A1* | 1/2005 | Ito et al. | 725/39 |

FOREIGN PATENT DOCUMENTS

| | | |
|---|---|---|
| EP | 1401198 A | 3/2004 |
| EP | 1528484 A | 5/2005 |
| EP | 1608167 A | 12/2005 |
| JP | 10-028244 A | 1/1998 |
| JP | 10-282244 | 10/1998 |
| JP | 2838892 | 10/1998 |

(Continued)

OTHER PUBLICATIONS

The above reference were first cited in the Search Report issued on Dec. 5, 2008, concerning the corresponding European Patent Application No. 07119229.8, which is enclosed.

(Continued)

*Primary Examiner*—Brian T Pendleton
*Assistant Examiner*—Jason K Lin
(74) *Attorney, Agent, or Firm*—Cowan, Liebowitz & Latman, P.C.

(57) ABSTRACT

An electronic program guide (EPG) generation apparatus that generates an EPG, the apparatus comprising: an information acquisition unit configured to acquire information regarding each program to be displayed in the EPG; a first determination unit configured to determine the size of a first display area representing the broadcast times of each program in the EPG, based on information regarding the broadcast times of each program included in the information regarding each program; a second determination unit configured to determine the size of a second display area for displaying, in the EPG, information regarding details of each program included in the information regarding each program, based on the information regarding each program; and a display controller configured to control the display, on a display means, of the EPG based on the sizes of the first and second display areas, determined by the first and second determination means.

10 Claims, 19 Drawing Sheets

FOREIGN PATENT DOCUMENTS

| | | |
|---|---|---|
| JP | 2000-358200 A | 12/2000 |
| JP | 2001-169203 | 6/2001 |
| JP | 2003-219297 | 7/2003 |
| JP | 2004-194250 | 7/2004 |

OTHER PUBLICATIONS

The above reference was cited in on Sep. 16, 2008 Japanese Office Action that issued in Japanese Patent Application 2006-289195, which is enclosed.

The above reference was cited in a Sep. 19, 2008 Chinese Office Action that issued in Chinese Patent Application 2007101514869, which is enclosed with the English translation.

* cited by examiner

FIG. 8

| START TIME | END TIME | BROADCAST TIME | PROGRAM NAME | PROGRAM DISPLAY SIZE | PROGRAM INFORMATION DISPLAY SIZE |
| --- | --- | --- | --- | --- | --- |
| 1:00 | 1:57 | 57 MINUTES | PROGRAM 1 | (57/180)×L | L/6 |
| 1:57 | 2:00 | 3 MINUTES | PROGRAM 2 | (3/180)×L | L/6 |
| 2:00 | 2:30 | 30 MINUTES | PROGRAM 3 | (30/180)×L | L/6 |
| 2:30 | 2:57 | 27 MINUTES | PROGRAM 4 | (27/180)×L | L/6 |
| 2:57 | 3:00 | 3 MINUTES | PROGRAM 5 | (3/180)×L | L/6 |
| 3:00 | 4:00 | 60 MINUTES | PROGRAM 6 | (60/180)×L | L/6 |

| START TIME 1201 | END TIME 1202 | BROADCAST TIME 1203 | PROGRAM NAME 1204 | PROGRAM DISPLAY SIZE 1205 | PROGRAM INFORMATION DISPLAY SIZE 1206 |
|---|---|---|---|---|---|
| 1:00 | 1:57 | 57 MINUTES | PROGRAM 1 | (57/180)×L | PROGRAM 1 + (PROGRAM 2)/2 |
| 1:57 | 2:00 | 3 MINUTES | PROGRAM 2 | (3/180)×L | PROGRAM 2 + (PROGRAM 1 + PROGRAM 3)/2 |
| 2:00 | 2:30 | 30 MINUTES | PROGRAM 3 | (30/180)×L | PROGRAM 3 + (PROGRAM 2 + PROGRAM 4)/2 |
| 2:30 | 2:57 | 27 MINUTES | PROGRAM 4 | (27/180)×L | PROGRAM 4 + (PROGRAM 3 + PROGRAM 5)/2 |
| 2:57 | 3:00 | 3 MINUTES | PROGRAM 5 | (3/180)×L | PROGRAM 5 + (PROGRAM 4 + PROGRAM 6)/2 |
| 3:00 | 4:00 | 60 MINUTES | PROGRAM 6 | (60/180)×L | PROGRAM 6 + (PROGRAM 5)/2 |

FIG. 15A

| 1501 | 1502 | 1503 | 1504 | 1505 | 1506 |
|---|---|---|---|---|---|
| START TIME | END TIME | BROADCAST TIME | PROGRAM NAME | PROGRAM DISPLAY SIZE | PROGRAM INFORMATION DISPLAY SIZE |
| 1:00 | 1:57 | 57 MINUTES | PROGRAM 1 | (57/180) × L | (57/180) × L |
| 1:57 | 2:00 | 3 MINUTES | PROGRAM 2 | (3/180) × L | (3/180) × L |
| 2:00 | 2:03 | 3 MINUTES | PROGRAM 3 | (3/180) × L | (3/180) × L |
| 2:03 | 2:30 | 27 MINUTES | PROGRAM 4 | (27/180) × L | (27/180) × L |
| 2:30 | 3:00 | 30 MINUTES | PROGRAM 5 | (30/180) × L | (30/180) × L |
| 3:00 | 4:00 | 60 MINUTES | PROGRAM 6 | (60/180) × L | (60/180) × L |

FIG. 15B

| START TIME 1501 | END TIME 1502 | BROADCAST TIME 1503 | PROGRAM NAME 1504 | PROGRAM DISPLAY SIZE 1505 | PROGRAM INFORMATION DISPLAY SIZE 1506 |
|---|---|---|---|---|---|
| 1:00 | 1:57 | 57 MINUTES | PROGRAM 1 | $(57/180) \times L$ | $(55/180) \times L$ |
| 1:57 | 2:00 | 3 MINUTES | PROGRAM 2 | $(3/180) \times L$ | $(5/180) \times L$ |
| 2:00 | 2:03 | 3 MINUTES | PROGRAM 3 | $(3/180) \times L$ | $(5/180) \times L$ |
| 2:03 | 2:30 | 27 MINUTES | PROGRAM 4 | $(27/180) \times L$ | $(25/180) \times L$ |
| 2:30 | 3:00 | 30 MINUTES | PROGRAM 5 | $(30/180) \times L$ | $(30/180) \times L$ |
| 3:00 | 4:00 | 60 MINUTES | PROGRAM 6 | $(60/180) \times L$ | $(60/180) \times L$ |

TIME
CHANNEL

EPG GENERATION APPARATUS, AND EPG GENERATION METHOD

BACKGROUND OF THE INVENTION

1. Field of the Invention

The present invention relates to an electronic program guide (EPG) generation apparatus, ad and EPG generation method.

2. Description of the Related Art

With the start of digital broadcasting, the spread of the Internet, and the integration of televisions and computers, opportunities for television users to display an EPG on a television screen or the like and view programs, schedule recordings, and so on have increased in recent years.

Here, EPG stands for "Electronic Program Guide". An EPG arranges and displays broadcasted programs in a matrix. With this matrix display, for example, the EPG displays channels and times two-dimensionally, and each program that makes up the EPG is displayed in a size proportional to the length of broadcast time of that program, as described in Japanese Patent No. 2838892. In order to make such an EPG more convenient for the viewer, it is desirable to, for example, simultaneously display as many time slots as possible for all channels.

Because the area in which the EPG is displayed is physically limited by the television screen, when as much program information as possible is displayed within that limited area, a sufficient display area cannot be secured for short programs, such as programs that run for several minutes. This results in an abbreviated display, in which only the frame or the like is used for program displays of short programs running for several minutes.

In response to this, Japanese Patent Laid-Open No. 10-28244 proposes an invention that alters the cell size of the matrix in accordance with the amount of information of each program in a matrix-type EPG. However, in this case, there are situations where many pieces of program information (channels) cannot be displayed in the display area.

In addition, Japanese Patent Laid-Open No. 2003-219297 proposes an invention that displays plural short programs collectively in a pop-up display. However, while it is possible to view the short programs through the pop-up display, the user is required to perform operations for displaying/hiding the pop-up display, and thus the usability decreases. Furthermore, the programs hidden beneath the pop-up display cannot be viewed while the pop-up display is active, and thus the original function of the EPG, which is viewing the details of various programs all at once, cannot be realized sufficiently.

In addition, Japanese Patent Laid-Open No. 2004-194250 proposes an invention that switches between a normal display in which the short programs are omitted and a detailed display in which the short programs are displayed through a user operation. However, the user is required to perform operations in this case as well; furthermore, the display of long programs is partially omitted in order to perform the detailed display, thus defeating the original purpose of the EPG display, which is to display a list of program information.

It should be noted that a method is known in which the program information display is performed after changing the display area, as described in Japanese Patent Laid-Open No. 2001-169203. However, there is a visual problem that if the area of a program having a broadcast time of less than a set amount of time is changed and the display performed, the program having a broadcast time of less than the set amount of time will in some cases be displayed at a size inconsistent with the ratio of the length of the broadcast time, and thus the length of the program cannot be judged from the size of the program display.

As described above, when displaying an electronic program guide, although display of the time slots of programs can be performed in accordance with the length of the broadcast time, information relating to a program cannot be displayed without being limited by the length of the broadcast time.

SUMMARY OF THE INVENTION

The present invention provides an electronic program guide (EPG) generation apparatus, and EPG generation method, and a computer program where display of the time slots of programs can be performed in accordance with the length of the broadcast time and information relating to a program can be displayed without being limited by the length of the broadcast time.

The present invention in one aspect of embodiments relates to an electronic program guide (EPG) generation apparatus that generates an EPG, the apparatus comprising: an information acquisition unit configured to acquire information regarding each program to be displayed in the EPG; a first determination unit configured to determine the size of a first display area representing the broadcast times of each program in the EPG, based on information regarding the broadcast times of each program included in the information regarding each program; a second determination unit configured to determine the size of a second display area for displaying, in the EPG, information regarding details of each program included in the information regarding each program, based on the information regarding each program; and a display controller configured to control the display, on a display means, of the EPG based on the sizes of the first and second display areas, determined by the first and second determination unit.

The present invention in another aspect of embodiments relates to an electronic program guide (EPG) generation apparatus that generates an EPG, the apparatus comprising: an information acquisition means for acquiring information regarding each program to be displayed in the EPG; a first determination means for determining the size of a first display area representing the broadcast times of each program in the EPG, based on information regarding the broadcast times of each program included in the information regarding each program; a second determination means for determining the size of a second display area for displaying, in the EPG, information regarding details of each program included in the information regarding each program, based on the information regarding each program; and a display controller for controlling the display, on a display means, of the EPG based on the sizes of the first and second display areas, determined by the first and second determination means.

The present invention in further aspect of embodiments relates to an electronic program guide (EPG) generation method for generating an EPG, the method comprising: acquiring information regarding each program to be displayed in the EPG; determining the size of a first display area representing the broadcast times of each program in the EPG, based on information regarding the broadcast times of each program included in the information regarding each program; determining the size of a second display area for displaying, in the EPG, information regarding details of each program included in the information regarding each program, based on the information regarding each program; and controlling the display, on a display means, of the EPG based on the determined sizes of the first and second display areas.

The present invention in further aspect of embodiments relates to a computer readable storage medium storing a program which, when executed on a computer causes the computer to perform an electronic program guide (EPG) generation method comprising: acquiring information regarding each program to be displayed in the EPG; determining the size of a first display area representing the broadcast times of each program in the EPG, based on information regarding the broadcast times of each program included in the information regarding each program; determining the size of a second display area for displaying, in the EPG, information regarding details of each program included in the information regarding each program, based on the information regarding each program; and controlling the display, on a display means, of the EPG based on the determined sizes of the first and second display areas.

Further features of the present invention will become apparent from the following description of exemplary embodiments with reference to the attached drawings.

BRIEF DESCRIPTION OF THE DRAWINGS

FIG. 8 is a diagram showing the correspondence between EPG data and program display size/program information display size according to the first embodiment of the present invention.

FIG. 12 is a diagram showing the correspondence between EPG data and program display size/program information display size according to the second embodiment of the present invention.

FIGS. 15A and 15B are diagrams showing the correspondence between EPG data and program display size/program information display size according to the third embodiment of the present invention.

DESCRIPTION OF THE EMBODIMENTS

Hereinafter, exemplary embodiments of the present invention shall be described with reference to the diagrams.

First Embodiment

Figure 1:
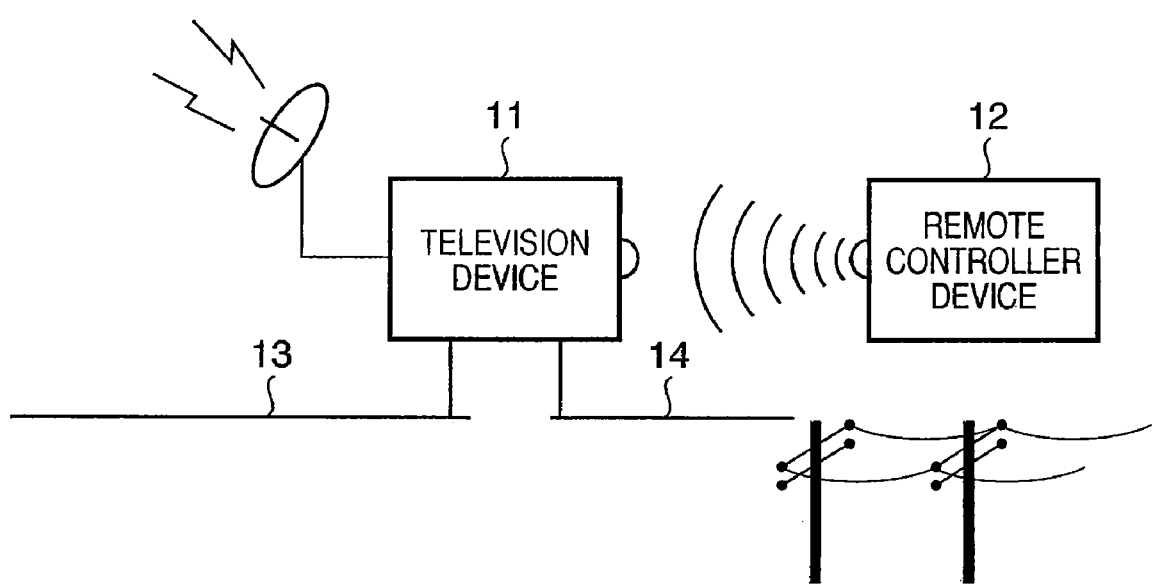
FIG. 1 is a diagram showing an example of a configuration of an EPG display system according to an embodiment of the present invention.

FIG. 1 is a diagram showing an example of a configuration of an EPG display system including a television device capable of EPG display according to a first embodiment of the present invention. The television device 11 shown in FIG. 1 is an EPG generation apparatus according to the present invention, and is a device capable of receiving a digital broadcast. A remote controller device 12 is a device for operating the television device 11 remotely, and is a device that the viewer of a television program uses in order to perform various operations, such as controlling, operating, and inputting data to the television device 11.

The television device 11 is also connected to a network 13, a telephone line 14, or the like. The network 13 is an indoor wired system, such as a LAN, installed indoors with the television device 11, and is capable of being connected to other information processing devices connected to the LAN. The telephone line 14 is a connection line for establishing a connection with an external network (for example, the Internet and so on). Furthermore, the television device 11 receives digital television broadcasts, sends and receives information to and from the remote controller device 12, sends and receives data to and from devices connected to the network 13, controls devices, and so on. Television image data, device image data, EPG data, control information, and the like obtained in this manner are displayed on a screen in the television device 11.

Figure 2:
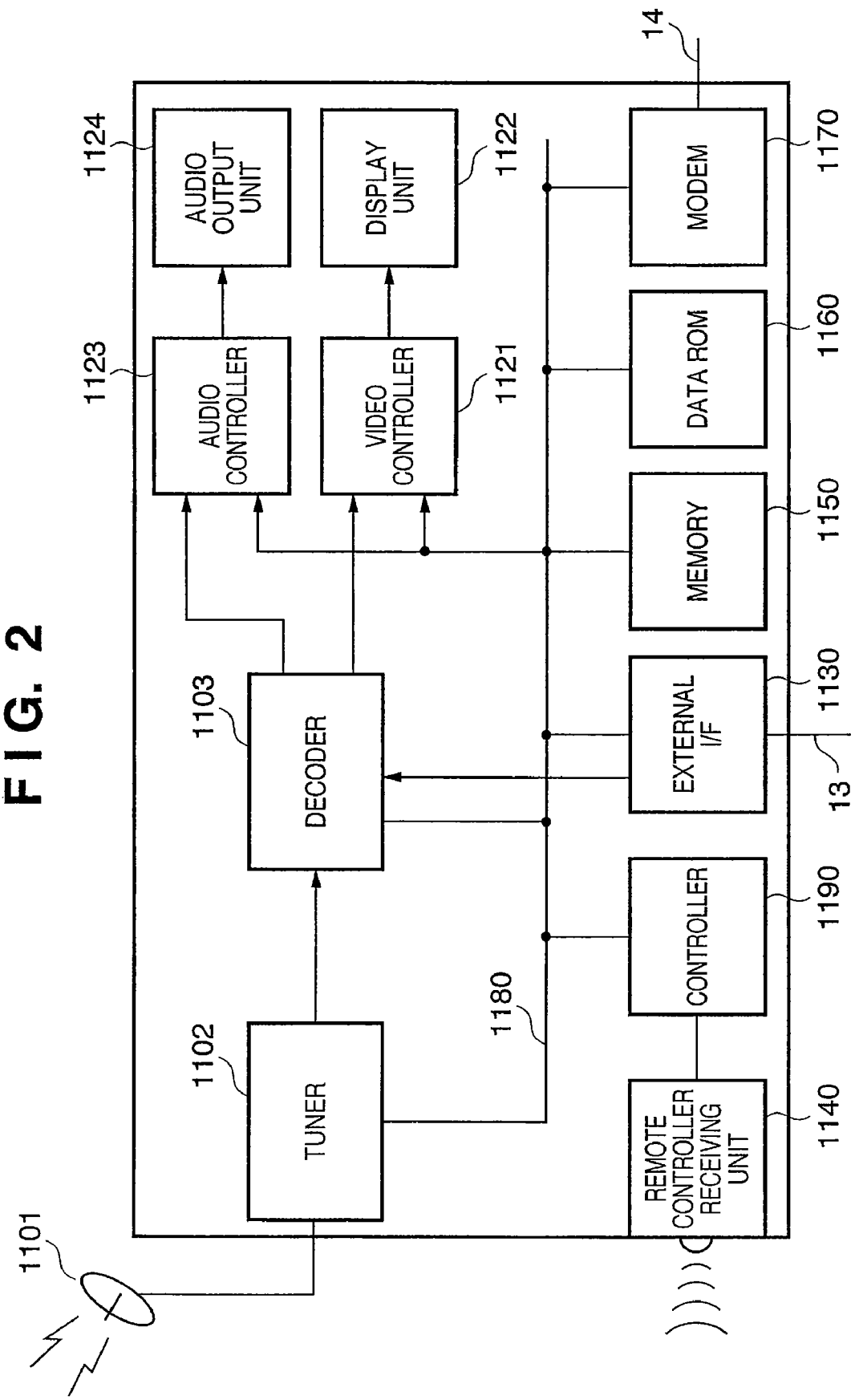
FIG. 2 is a block diagram showing an example of a detailed configuration of a television device 11 according to an embodiment of the present invention.

FIG. 2 is a block diagram showing an example of the television device 11 configured as the EPG generation apparatus according to the first embodiment of the present invention. In FIG. 2, an antenna 1101 receives a television wave from the external apparatuses, converts the wave into a high-frequency electric signal, and transmits the signal to a tuner 1102. The tuner 1102 amplifies the high-frequency television signal transmitted from the antenna 1101, selects a desired channel, demodulates the high-frequency television signal modulated in a carrier wave, and outputs the resultant to a decoder 1103.

The decoder 1103 divides the signal obtained from the tuner 1102 into video data and audio data, as well as other data (for example, additional data such as broadcast data, EPG data, and the like), and decodes the respective data. The video data is outputted to a video controller 1121, the audio data is outputted to an audio controller 1123, and the other data is outputted to an internal bus 1180.

The video controller 1121 outputs displayed image data (RGB image data) in which the video data outputted by the decoder 1103 and image data obtained through the internal bus 1180 are switched or synthesized, along with horizontal and vertical synchronizing signals, to a display unit 1122. The display unit 1122 is a television display device such as a CRT, LCD, PDP, SED, or the like, and displays an image, taking the RGB image data and horizontal and vertical synchronizing signals outputted by the video controller 1121 as input signals.

The audio controller 1123 switches or synthesizes the audio data outputted by the decoder 1103 and the audio data obtained through the internal bus 1180, or controls the volume, tone, ambience, or the like, and outputs the resultant to an audio output unit 1124. The audio output unit 1124 amplifies the audio signal inputted from the audio controller 1123, and outputs audio through a speaker.

An external I/F 1130 exchanges data with external AV devices, personal computers, or the like via the network 13. In addition, a remote controller receiving unit 1140 receives various data sent when a television viewer operates the remote controller device 12, and transfers the received data to a controller 1190. A memory 1150 receives, through the internal bus 1180, EPG data and various types of additional data for television broadcast outputted by the decoder 1103, various types of data inputted through the external I/F 1130, and the like, and stores this data.

A data ROM 1160 is a memory (ROM) storing data that is pre-installed in the television device 11, such as character (font) data used in display and printing, image data such as icons and buttons used in EPG display, and the like.

A modem 1170 is a modem device used by the television device 11 to exchange data with the exterior through the telephone line 14. The modem 1170 is used in cases such as, for example, when sending viewing information to a management server in order to bill a viewer for viewing a fee-based broadcast, data exchange with a broadcast station when viewing a two-way broadcast, connecting to a provider in order to connect to the Internet, and so on.

The controller 1190 is connected to the internal bus 1180, and performs overall control of the stated units included within the television device 11. For example, when receiving a television broadcast, the controller 1190 controls the aforementioned antenna 1101, tuner 1102, and decoder 1103, thereby setting and controlling the changing of channels, the storage of data used in data broadcast, EPG data, and so on. In addition, the controller 1190 controls the video controller 1121, thereby performing display setting and control such as switching between video data from the decoder 1103 and data used in data broadcast, EPG data, and video data from the external I/F 1130, synthesizing these video data, and so on.

The controller 1190 also controls the audio controller 1123, controlling the synthesis and output of audio data inputted from various units. Furthermore, the controller 1190 analyzes key code data that has been received by the remote controller receiving unit 1140 from the remote controller device 12, and performs processing in accordance therewith. Further still, the controller 1190 has a clock function capable of measuring the date, the day of the week, the time, and so on, and thus can manage and display the day of the week, the time, and so on.

The internal bus 1180 is an internal bus that connects the various units included in the television device 11 in the manner shown in FIG. 2, and is used for transferring image data, audio data, and the like, and transferring information between the various units, and the like, as described earlier.

The television device 11 according to the present embodiment includes the display unit 1122 that displays the EPG. Detailed program information regarding each of the programs displayed in the EPG is acquired from the antenna 1101 and the tuner 1102. The acquired program information is stored in the memory 1150 via the decoder 1103.

An instruction to display the program guide is made from the remote controller device 12 via the remote controller receiving unit 1140, and via the controller 1190; the EPG is created based on the program information regarding each program stored in the memory 1150 and is displayed by the video controller 1121. Note that a detailed operating procedure and the like of the television device 11 according to the present embodiment shall be described later.

Figure 3:
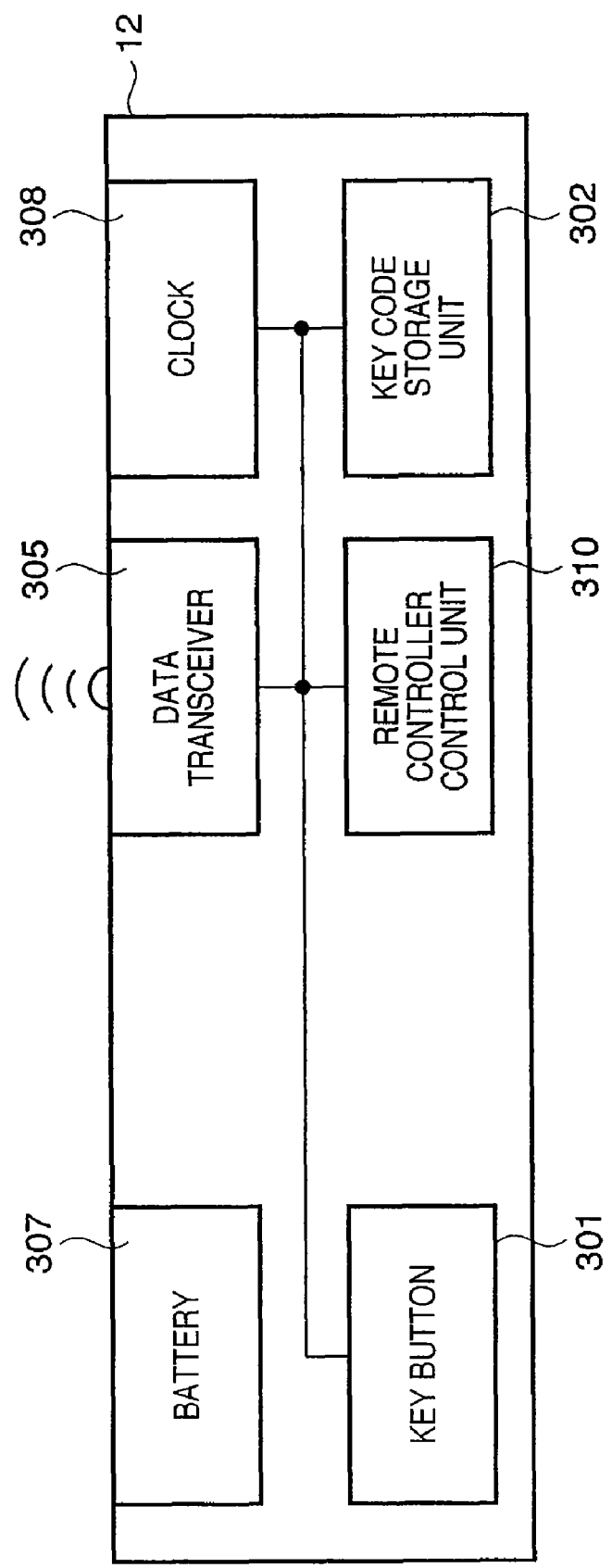
FIG. 3 is a block diagram showing an example of a configuration of a remote controller device 12 according to an embodiment of the present invention.

FIG. 3 is a block diagram showing an example of a configuration of the remote controller device 12 according to the first embodiment of the present invention. In FIG. 3, a key button 301 is a button group for performing a desired operation on the television device 11. The key button 301 is manipulated by the user of the remote controller device 12, and is controlled by a remote controller control unit 310. A key code storage unit 302 is a storage unit, such as a ROM, in which key codes for television operations, settings, and the like are stored in advance.

A data transceiver 305 sends various data, such as key codes of operations, to the remote controller receiving unit 1140 within the television device 11. A battery 307 supplies power for operating the remote controller device 12. A clock 308 measures the date, day of the week, the time, and the like. The remote controller control unit 310 detects keys of the key button 301 that have been manipulated and depressed, and controls the abovementioned units through key codes corresponding to the depressed keys.

In other words, the remote controller device 12 (remote operating apparatus) according to the present embodiment is a device for instructing a display device for displaying an EPG (the television device 11) to display the EPG.

Figure 4:
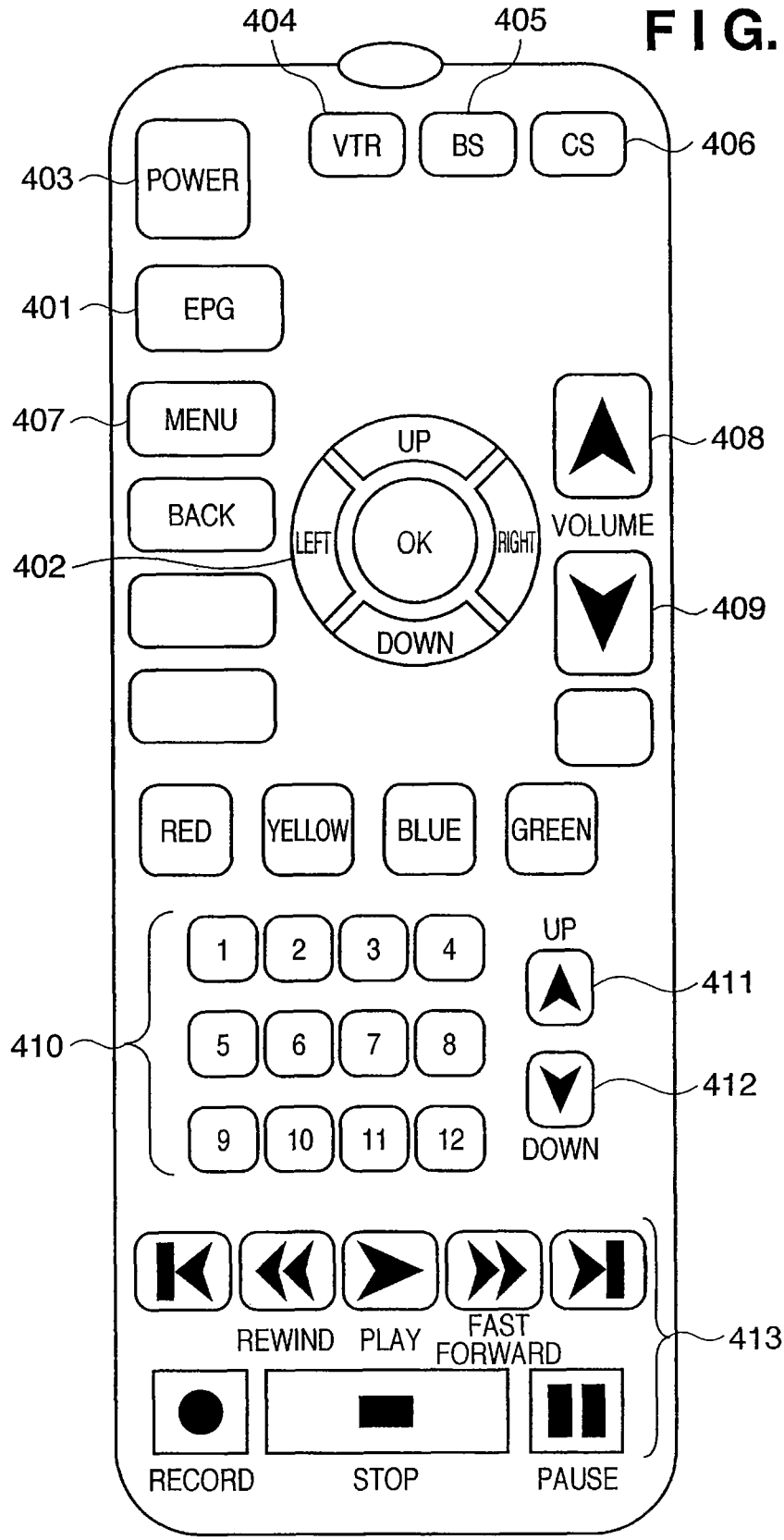
FIG. 4 is a diagram showing an example of an external view of the remote controller device 12 according to an embodiment of the present invention.
Figure 6:
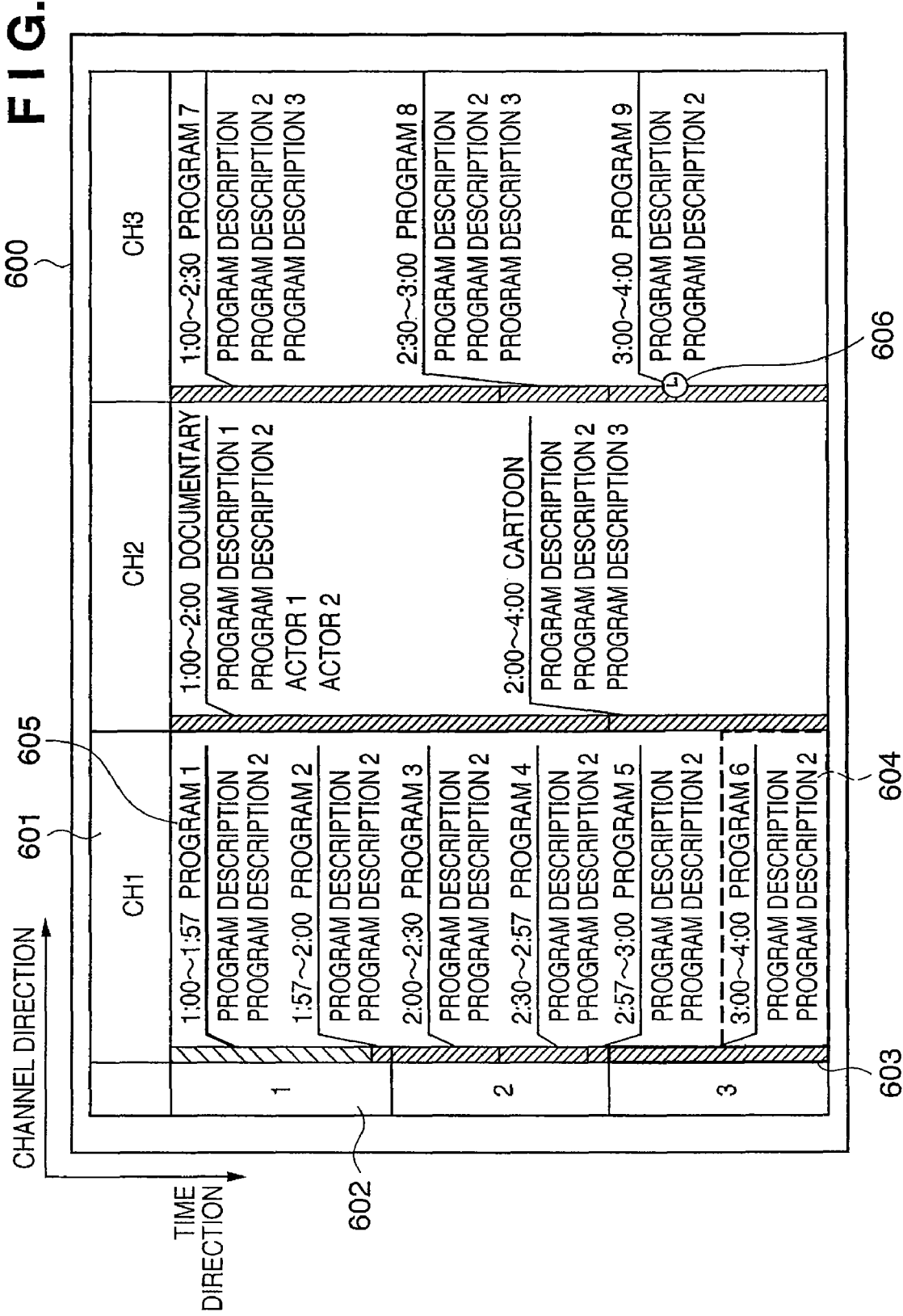
FIG. 6 is a diagram showing an example of an EPG screen according to an embodiment of the present invention.

FIG. 4 is a diagram showing an example of an external view of the remote controller device 12 according to the first embodiment of the present invention. When the EPG display key 401 shown in FIG. 4 is depressed, an EPG such as is shown in FIG. 6 is displayed on the screen of the television device 11. Operation keys 402 are configured as left, right, up, and down cursor keys, and an OK key, and are used when performing menu operations and EPG operations.

In addition, as shown in FIG. 4, the remote controller device 12 also includes other keys, such as a power key 403 for turning the power of the television device 11 on/off, keys 404 to 406, for selecting external device inputs, such as VTR, BS broadcast, CS broadcast, and so on. Furthermore, the remote controller device 12 includes a menu key 407 for displaying an operation menu screen, a volume up key 408 and a volume down key 409 for setting the volume, and number keys 410 used for setting the television channel and the like. Further still, the remote controller device 12 includes a channel up key 411 and a channel down key 412 used for changing the channel up/down, as well as external device operational keys 413.

Figure 5:
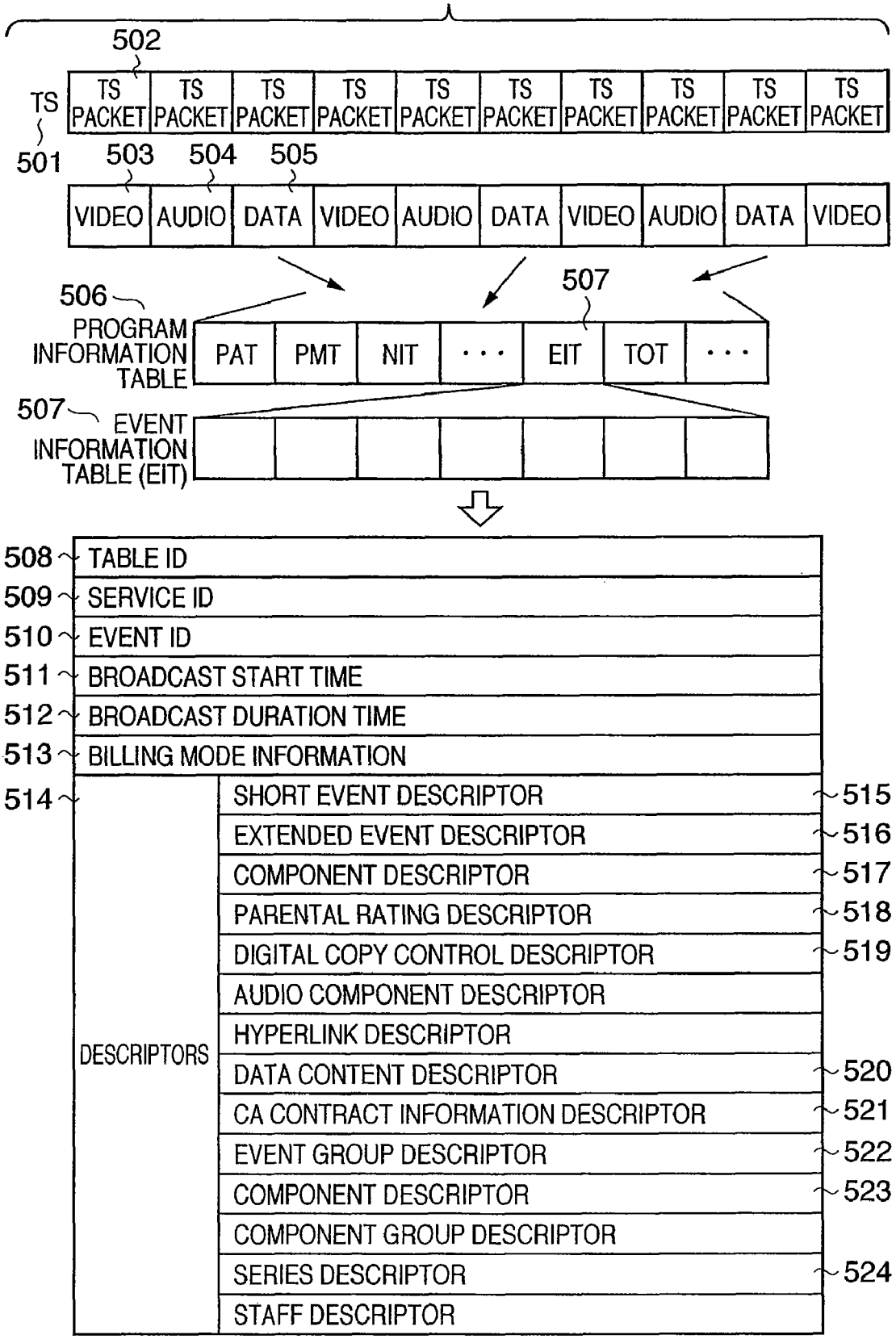
FIG. 5 is a diagram showing an example of a configuration of a digital broadcast wave and EPG data according to an embodiment of the present invention.

FIG. 5 is a diagram showing an example of a configuration of a digital broadcast wave and EPG data received in the present embodiment. Digitized broadcast signals are defined by various standards such as IEC, IEEE, and ARIB (Association of Radio Industries and Businesses), standards created by various regulatory groups, and so on, and are called TS signals. A TS signal 501 is configured of plural TS packets 502; each TS packet is used as a video part 503, which is a video signal, an audio part 504, which is an audio signal, or as a data part 505, which is a data signal different from audio/video.

A program information table 506 can be configured by collecting and reconstituting the data parts 505 within a TS signal 501. Information unique to broadcast programs, such as a Program Association Table (PAT), a Program Map Table (PMT), a Network Information Table (NIT), an Event Information Table (EIT), and a Time Offset Table (TOT), is included in the program information table 506. The EPG data used in the present embodiment is written within an EIT (event information table) 507 as several items and descriptors.

In addition to a table ID 508, a service ID 509, an event ID 510 and the like, a broadcast start time 511 and broadcast duration time 512 of the program, billing mode information 513, and so on are written in the first part of the event information table 507. Several descriptors 514 are present thereafter. Of these descriptors 514, the items related to the EPG in the present invention shall be described hereinafter.

The name of a program, a description regarding the program, and so on are written in a short event descriptor 515. Names of the actors, scriptwriters, hosts, and the like, as well as comments and the like regarding the program, are written in an extended event descriptor 516. A component descriptor 517 is a descriptor representing the genre of the broadcasted program. First, there are primary genres (types) for broadcasted programs, including "news", "sports", "drama", "movies", "variety", "education", and the like. Furthermore, sub-genres are also specified, the sub-genres providing more detail for each of the primary genres (for example, "soccer", "baseball", and "the Olympics" can be given as sub-genres of the "sports" primary genre).

An age limit for viewing is written in a parental rating descriptor 518. Restriction information regarding digital and analog copying is written in a digital copy control descriptor 519. Information regarding data broadcast related to the program is written in a data content descriptor 520. Information regarding viewing of fee-based programming, whether or not recording of the program can be scheduled, and the like is written in a CA contract information descriptor 521. Event sharing and grouping information, and event relay link information, are written in an event group descriptor 522. Grouping information for components within an event, such as in multi-angle viewing, is written in a component descriptor 523. Information of programs that are part of a series, re-broadcasting, and so on is written in a series descriptor 524.

As described above, the television device 11 according to the present embodiment receives a TS signal as a broadcast wave through the antenna 1101 and the tuner 1102. The decoder 1103 extracts only the data part 505 from the received TS signal and outputs the extracted data to the internal bus 1180. The controller 1190 reconstitutes the event information table 507 from the data outputted to the internal bus 1180, and stores the resultant in the memory 1150 as EPG data of the format such as is shown in FIG. 5.

The EPG data is read out from the memory 1150 in accordance with a request from the remote controller device 12 or the like performed by the viewer of the television. Furthermore, an EPG image is generated using EPG display image data stored in the data ROM 1160, and an EPG screen is displayed on the display unit 1122 through the video controller 1121.

FIG. 6 is a diagram showing an example of an EPG screen according to the first embodiment of the present invention. An EPG screen 600 is divided into areas on a channel-by-channel basis, and channel numbers 601 are indicated at the top of each of these areas. Numbers 602 that represent time slots are indicated as well. Note that in the EPG screen 600, the vertical direction is the time-axis direction, with broadcast times considered to be progressing in the downward direction. The horizontal direction is the channel-axis direction, and is the direction in which the channel areas are presented. FIG. 6 illustrates an exemplary display showing three channels and time slots spanning three hours. However, this is only a single example, and the display format of the EPG screen is not intended to be limited to that shown in FIG. 6. In other words, there may be more (or less) channels, as well as longer (or shorter) time slots, for example.

In the present embodiment, the area in which programs are displayed as rectangles corresponding to the broadcast times of those programs shall be described as the program display area 603. In addition, the dotted line area in which information regarding the content of a program, such as the program name, information describing the program, and so on, shall be described as the program information display area 604. A line extending from the program display area 603 is displayed in the program information display area 604, and the broadcast time slot of the program for which details are indicated in the program information display area 604 can be confirmed based on the program display area 603. For example, the time slot of a program 6 broadcasted from 3:00 to 4:00 can be understood based on the size of the rectangle in the program display area 603.

In the present embodiment, each channel that broadcasts programs is configured, in the time-axis direction of the EPG, of a program display area 603 column and a program information display area 604 column, and the EPG is in turn configured by arranging these adjacent to one another.

In the case where the user has specified a program using the remote controller device 12, the program name is highlighted. FIG. 6 illustrates a case in which a program 1, broadcasted on CH1 from 1:00 to 1:57, is highlighted. Highlighting may be performed by putting the characters and line in boldface, by changing the color of the characters, background and so on, or the like. A mark 606 indicates that scheduled recording has been set for a program. The mark 606 can be displayed in the vicinity of where the extending line and the program display area 603 meet.

Figure 7:
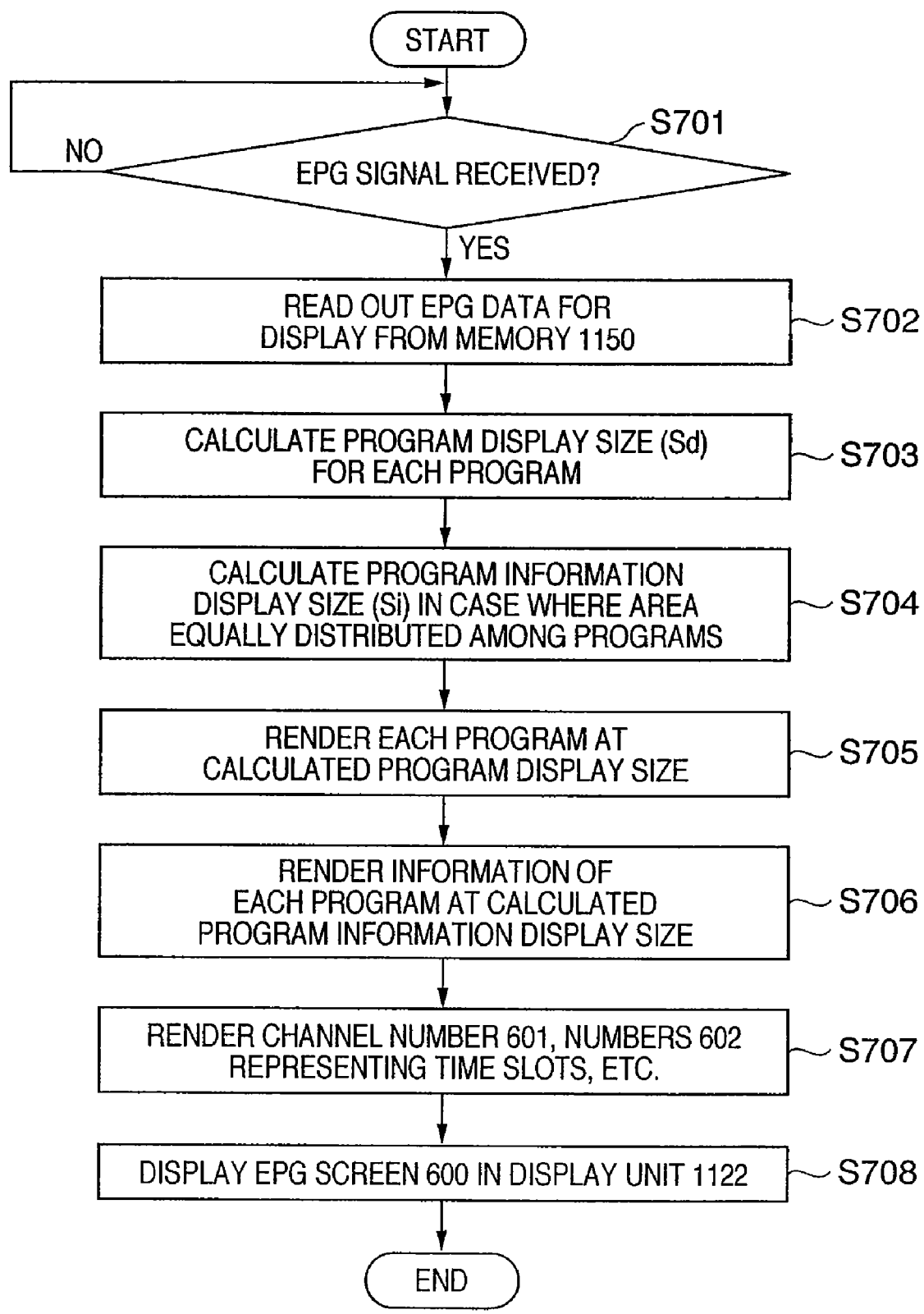
FIG. 7 is a flowchart showing an example of a procedure for carrying out an EPG screen display in the television device 11 according to a first embodiment of the present invention.

Next, descriptions shall be given regarding processing for displaying the EPG screen in the television device 11 according to the present embodiment having the above-mentioned configuration. FIG. 7 is a flowchart showing an example of a procedure for carrying out an EPG screen display in the television device 11 according to the first embodiment of the present invention.

Note that it is assumed that prior to this processing, the television device 11 receives a broadcast wave when the power is turned on, extracts EPG data from the received broadcast wave, and stores this EPG data in the memory 1150. In addition, when the viewer wishes to browse the EPG screen when viewing a television broadcast, s/he aims the remote controller device 12 in the direction of the television device 11 and depresses the EPG display key 401. Through this, an EPG signal is sent from the data transceiver 305 of the remote controller device 12 and is received by the remote controller receiving unit 1140 of the television device 11.

First, in step S701 in FIG. 7, it is determined in the television device 11 whether or not the EPG display key 401 of the remote controller device 12 has been depressed, based on whether or not the remote controller receiving unit 1140 has received an EPG signal. In the case where an EPG signal has been received (YES in step S701), the procedure advances to step S702. However, in the case where an EPG signal has not been received (NO in step S701), monitoring for the reception of the EPG signal is continued.

Next, in step S702, the controller 1190 reads out EPG data necessary for carrying out the EPG screen display from the memory 1150; for example, the controller 1190 reads out three hours' worth of EPG data for three channels corresponding to the present time within the controller 1190.

Then, in step S703, a display size of the program display area 603 (hereinafter, referred to simply as "program display size (Sd)") proportional to the various broadcasting times is calculated for each of the programs in the EPG data read out in step S702. Furthermore, in step S704, a display size of the program information display area 604 when evenly distributing the program display area 603 (hereinafter, referred to simply as "program information display size (Si)") is calculated for each of the programs in the EPG data read out in step S702.

Calculations of the program display size and the program information display size in steps S703 and S704, respectively, shall be described in detail with reference to FIG. 8. FIG. 8 is a diagram showing the correspondence between the EPG data and the program display size and program information display size, according to the present embodiment.

In FIG. 8, a start time 801, an end time 802, a broadcast time 803, and a program name 804 each indicate information regarding a broadcasted program, and correspond to the EPG data according to the present embodiment. This data is stored in table format in the memory 1150. A program display size 805 indicates the program display size corresponding to each program, and a program information display size 806 indicates the program information display size corresponding to each program.

FIG. 8 illustrates a case in which programming spanning three hours (180 minutes), from 1:00 to 4:00, is displayed in the EPG screen. Here, assuming the total of the program display size for one channel is L (cm), the program display size proportional to the broadcast time as calculated through the processing in step S703 is (57/180)×L in the case of program 1, which is a 57-minute program. The same calculation can be made for programs 2 through 6. However, note that the unit of the display size L is an example; the unit used is not limited to the metric system. The number of pixels, a predetermined unit length, or the like may be used instead. Next, because there are six programs that are evenly distributed, the program information display sizes as calculated through the processing in step S704 are each L/6.

Figure 9:
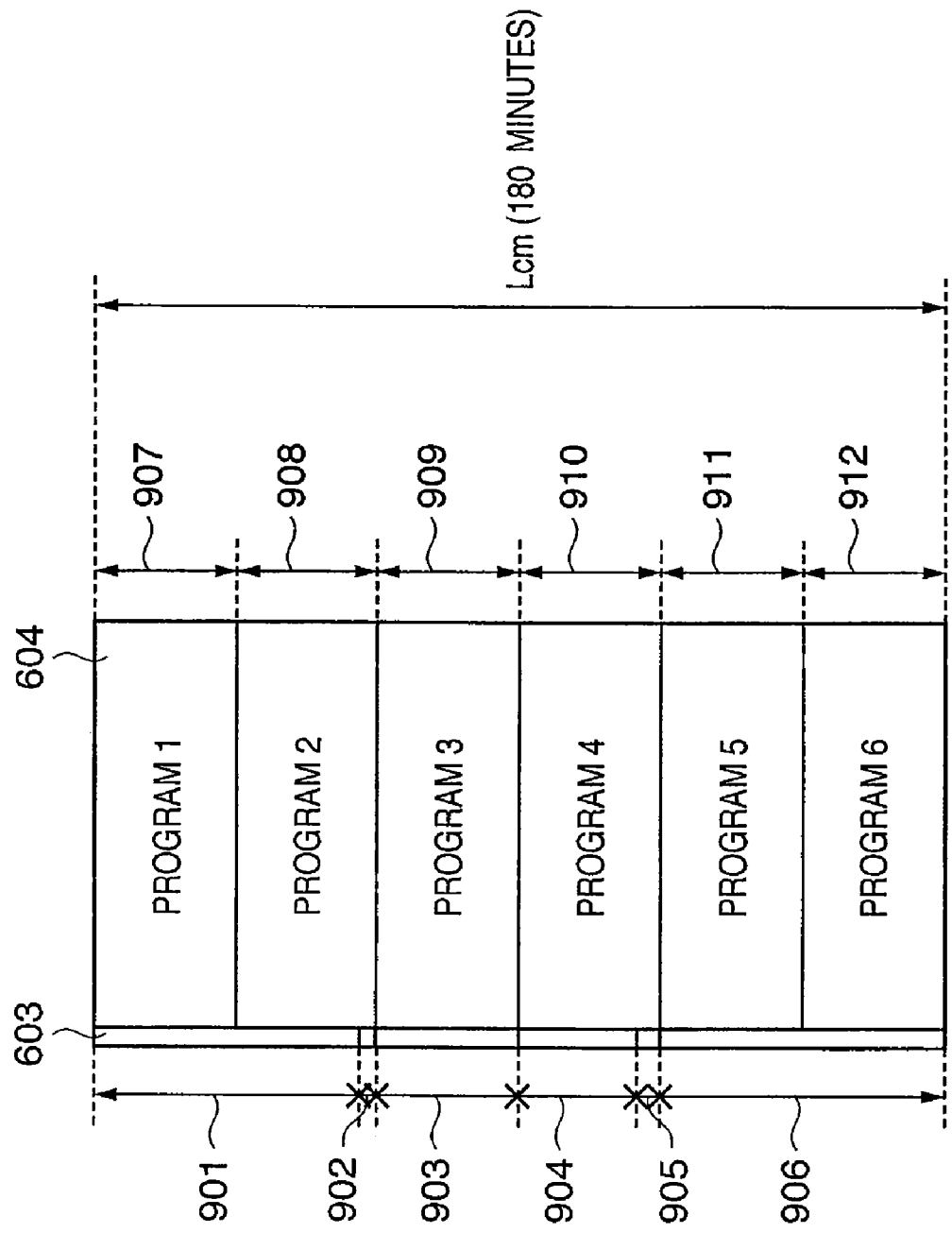
FIG. 9 is a diagram showing an example of the allocation of a program display area 603 and a program information display area 604 in an electronic program guide according to the first embodiment of the present invention.

FIG. 9 is an example of division of the display area based on the program display sizes 805 and the program information display sizes 806 illustrated in FIG. 8. FIG. 9 shows the program display area 603 and the program information display area 604 for one channel.

In FIG. 9, 901 to 906 indicate the respective program display sizes of programs 1 to 6. Furthermore, 907 to 912 indicate the respective program information display sizes of the programs 1 to 6. In this manner, the program display area 603 is divided into a rectangular format with the rectangles having lengths (sizes) in accordance with the broadcast times of each program, whereas the program information display area 604 is divided into a rectangular format with the rectangles having lengths (sizes) that are equal regardless of the broadcast times of each program.

Returning to the explanation of the flowchart in FIG. 7, the procedure advances to step S705 following the calculation of the program information display size performed in step S704. In step S705, the controller 1190 renders the program display area 603 corresponding to the length of the broadcast times of each program based on the program display size calculated in step S703. Next, in step S706, the controller 1190 sets the program information display area 604 for each program based on the program information display size calculated in step S704, and renders the information of each program.

Furthermore, in step S707, the controller 1190 renders the channel numbers 601, the time slot numbers 602, and thereby completes the EPG screen.

Data of the completed EPG screen is displayed in the display unit 1122 by the video controller 1121 in step S708. Through this, an EPG screen 600 such as that shown in FIG. 6 is displayed in the display unit 1122 of the television device 11.

In this manner, in the present embodiment, it is possible to display, in the EPG screen, a combination of a display format in which program displays are arranged at sizes corresponding to the lengths of the program broadcast times and a display format in which program information displays are arranged at a ratio without being limited by the length of the broadcast time. Through this, the same visibility of the broadcast time as traditional EPGs can be maintained, while allocating areas to programs with shorter broadcast times as well, and displaying more program information.

Second Embodiment

Next, a second embodiment shall be described. Note that the configuration of the EPG display system including the television device capable of EPG display is the same as in the first embodiment, and thus descriptions thereof shall be omitted.

Figure 10:
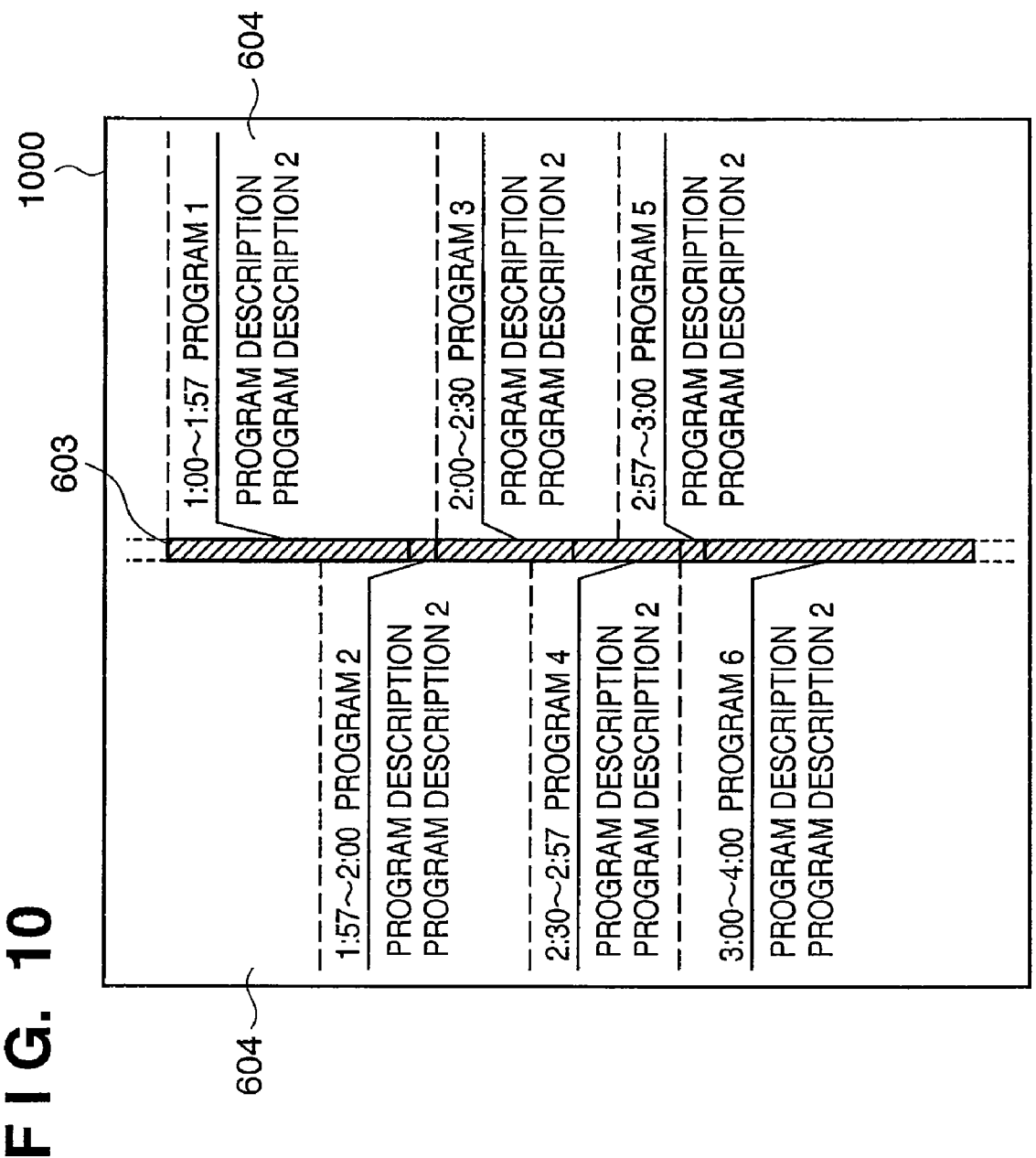
FIG. 10 is a diagram showing an example of an EPG screen according to a second embodiment of the present invention.

FIG. 10 is a diagram showing an example of an EPG screen display according to the present embodiment. It should be noted that while an EPG screen 1000 as shown in FIG. 10 shows an exemplary display in which three hours' worth of time slots are shown for a single channel, the display format is not intended to be limited thereto, and may display plural channels arranged within the same screen.

As shown in FIG. 10, in the present embodiment, a column made up of a program display area 603 is configured in the time-axis direction of the EPG for each channel broadcasting a program. Furthermore, two columns made up of program information display areas 604 are configured, and the EPG is configured so that the program display area 603 column is arranged between these two columns. In other words, the EPG has a characteristic in that program information display areas 604 are displayed to the right and left of the program display area 603.

Figure 11:
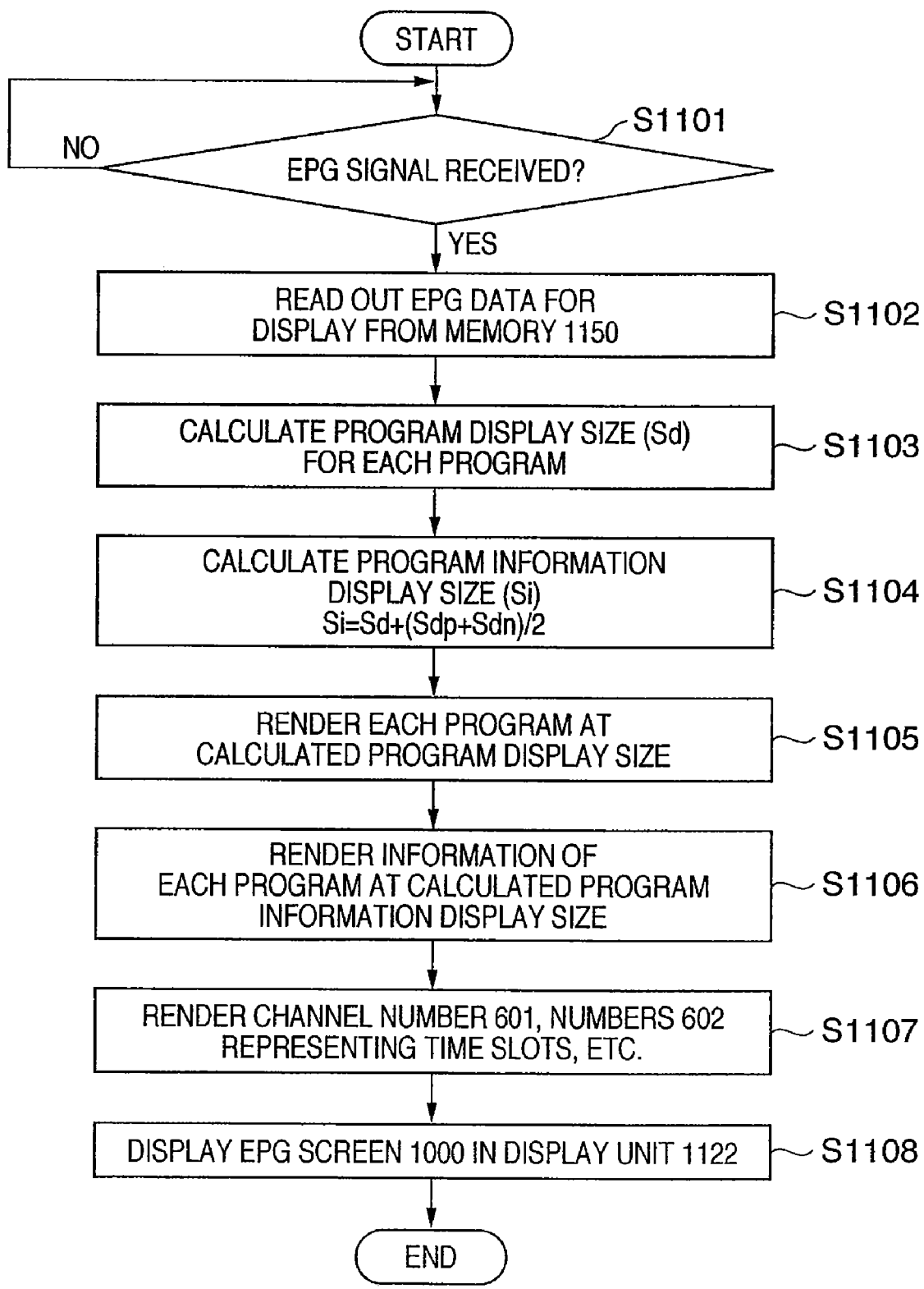
FIG. 11 is a flowchart showing an example of a procedure for carrying out an EPG screen display in a television device 11 according to the second embodiment of the present invention.

Next, processing for displaying the EPG screen 1000 shown in FIG. 10 according to the present embodiment shall be described with reference to FIG. 11. FIG. 11 is a flowchart showing an example of a procedure for carrying out an EPG screen display in the television device 11 according to the second embodiment of the present invention.

Note that it is assumed that prior to this processing, the television device 11 receives a broadcast wave when the power is turned on, extracts EPG data from the received broadcast wave, and stores this EPG data in the memory 1150. In addition, when the viewer wishes to browse the EPG screen when viewing a television broadcast, s/he aims the remote controller device 12 in the direction of the television device 11 and depresses the EPG display key 401. Through this, an EPG signal is sent from the data transceiver 305 of the remote controller device 12 and is received by the remote controller receiving unit 1140 of the television device 11.

Steps S1101 to S1103 in FIG. 11 correspond to steps S701 to S703 in FIG. 7, and therefore descriptions thereof shall be omitted from the present embodiment.

The procedure advances to step S1104 after the program display size (Sd) is calculated in step S1103. In step S1104, a program information display size (Si) is calculated for each of the programs in the EPG data read out, based on the following equation.

program information display size (Si)=program display size (Sd)+(program display size of previous program (Sdp)+ display size of next program (Sdn))/2

After the program information display size has been calculated, the procedure advances to step S1105. The processing from steps S1105 to S1108 is the same as the processing from steps S705 to S708 in FIG. 7. However, rendering of the information of the program in step S1107 is performed so that the program display area 603 is at the center and the information of the programs are arranged alternating on the right and left thereof. To be more specific, in the case where programs of the same channel are to be displayed in the EPG screen 1000, and numbers are given to the programs in accordance with the broadcast order starting at the beginning, the odd-numbered programs and the even-numbered programs are divided up by the program display area 603, and are arranged as shown in FIG. 10.

The calculation of the program display size and the program information display size is steps S1103 and S1104 respectively shall be described in further detail hereinafter with reference to FIG. 12. FIG. 12 is a diagram showing the correspondence between the EPG data and the program display size and program information display size, according to the present embodiment.

In FIG. 12, a start time 1201, an end time 1202, a broadcast time 1203, and a program name 1204 each indicate information regarding a broadcasted program, and correspond to the EPG data according to the present embodiment. This data is stored in table format in the memory 1150. A program display size 1205 indicates the program display size corresponding to each program, and a program information display size 1206 indicates the program information display size corresponding to each program.

FIG. 12 illustrates the case where a program display spanning three hours (180 minutes), from 1:00 to 4:00, is displayed in the EPG screen. Here, assuming the overall display size is L (cm), the program display size proportional to the broadcast time as calculated through the processing in step S1103 is (57/180)×L in the case of program 1, which is a 57-minute program. The same calculation can be made for programs 2 through 6. Note that the unit of the display size L is the same as in the first embodiment.

Next, the program information display size calculated through the processing in step S1104 is, in the case of program 1 in FIG. 12, (display size of program 1+display size of program 2/2). The program information display size of program 2 is (display size of program 2+(display size of program 1+display size of program 2)/2). Similar calculations can be made for programs 3 through 6 as well.

Figure 13:
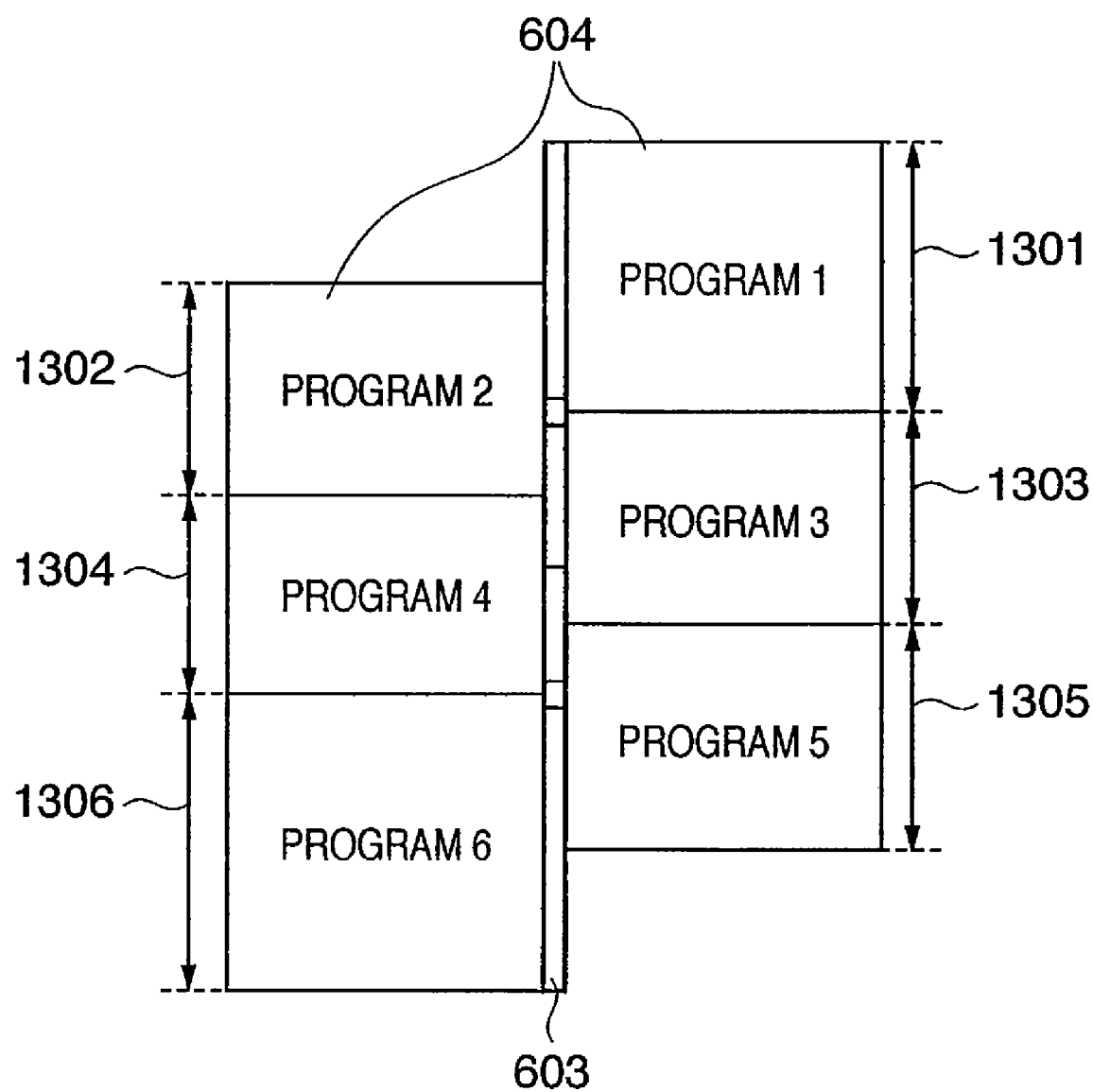
FIG. 13 is a diagram showing an example of the allocation of a program display area 603 and a program information display area 604 in an electronic program guide according to the second embodiment of the present invention.

FIG. 13 is an example of division of the display area based on the program display sizes 1205 and the program information display sizes 1206 illustrated in FIG. 12. FIG. 13 shows the program display area 603 and the program information display area 604 for one channel. In FIG. 13, 1301 to 1306 indicate the respective program information display sizes of the programs 1 to 6.

Above, the program information display is divided and displayed alternating on the left and right; however, dividing the programs into programs for which the broadcast time is shorter and longer than a set time, determining a degree of viewer preference and dividing the programs into programs with a high degree of viewer preference and a low degree of viewer preference, and so on are also possible. Such division can be realized by, for example, including information regarding division positions in the program information in advance.

In this manner, according to the present embodiment, by arranging areas for displaying program information to the right and left of the broadcast time displays of programs, more display area can be secured, as compared to a conventional program display.

Third Embodiment

Next, a third embodiment shall be described. In the first embodiment described above, the program information display area 604 is evenly distributed among the various programs. However, a characteristic of the present embodiment is that the program information display area 604 is distributed in accordance with the broadcast times of programs, in the same manner as the program display area 603, and the program information display area 604 is adjusted for programs in which the program information cannot be displayed on only a single line. Note that the configuration of the EPG display system including the television device capable of EPG display is the same as in the first embodiment, and thus descriptions thereof shall be omitted.

Figure 14:
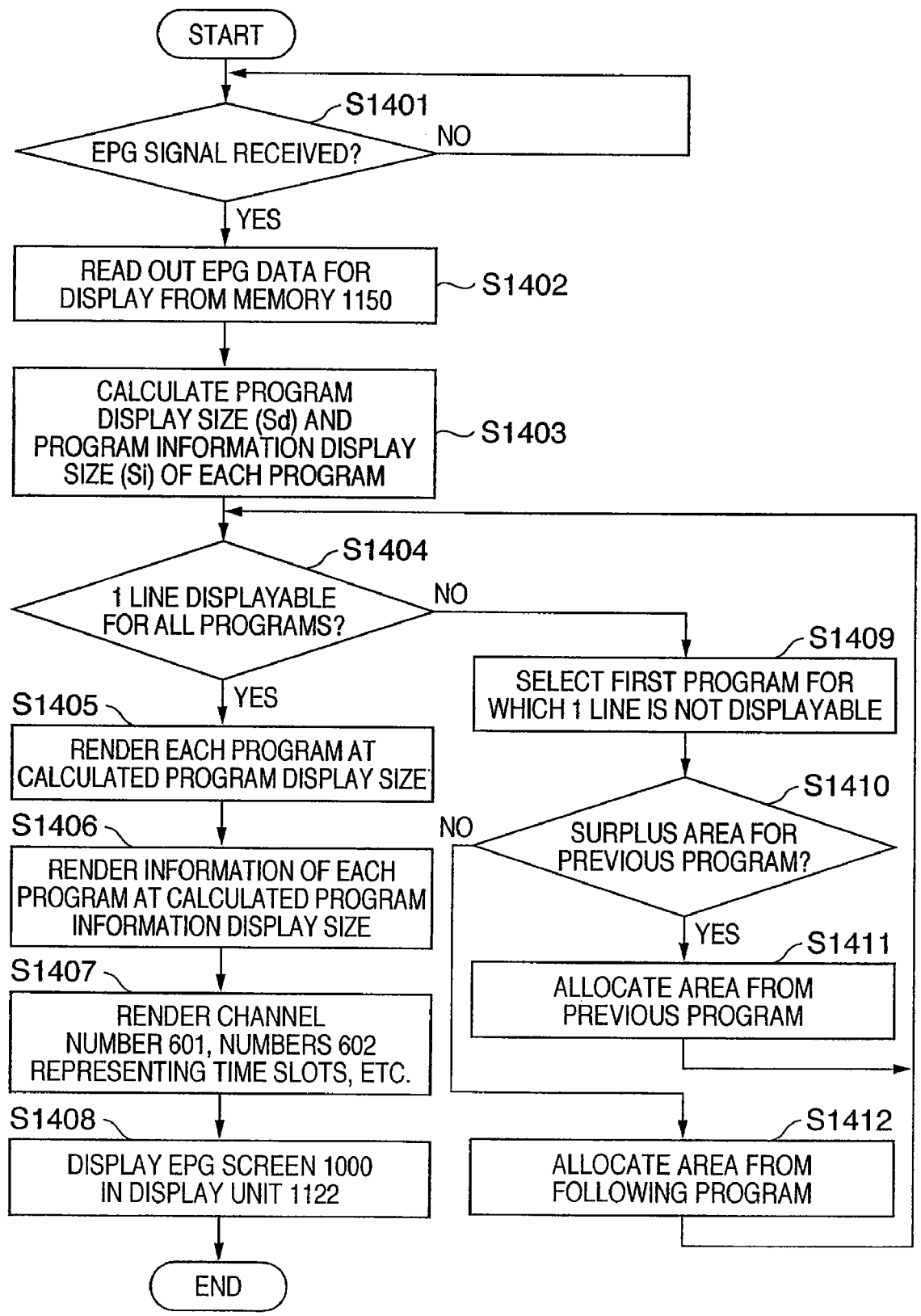
FIG. 14 is a flowchart showing an example of a procedure for carrying out an EPG screen display in a television device 11 according to a third embodiment of the present invention.

Processing according to the present embodiment shall be described with reference to FIGS. 14, 15A, and 15B. FIG. 14 is a flowchart showing an example of a procedure for carrying out an EPG screen display in the television device 11 according to the third embodiment of the present invention. FIGS. 15A and 15B are diagrams showing the correspondence between the EPG data and the program display size and program information display size, according to the present embodiment. FIG. 15A indicates a correspondence relationship prior to adjustment of the program information display area 604, whereas FIG. 15B indicates a correspondence relationship after the adjustment of the program information display area 604.

Note that it is assumed that prior to this processing, the television device 11 receives a broadcast wave when the power is turned on, extracts EPG data from the received broadcast wave, and stores this EPG data in the memory 1150. In addition, when the viewer wishes to browse the EPG screen when viewing a television broadcast, s/he aims the remote controller device 12 in the direction of the television device 11 and depresses the EPG display key 401. Through this, an EPG signal is sent from the data transceiver 305 of the remote controller device 12 and is received by the remote controller receiving unit 1140 of the television device 11.

Steps S1401 and S1402 of FIG. 14 correspond to steps S701 and S702 of FIG. 7, and thus descriptions thereof shall be omitted in the present embodiment. In step S1403, a program display size (Sd) and a program information display size (Si) proportional to the length of the broadcast times of the respective programs are calculated for each of the programs in the EPG data read out in step S1402. The calculated pieces of size information are temporarily stored in the memory 1150. An example of the size information stored at this time is shown in FIG. 15A.

The procedure advances to step S1404 after the program information display size (Si) is calculated in step S1403. In step S1404, it is determined whether or not it is possible to display at least one line's worth of the program information in the program information display size (Si) calculated in step S1403 for each program in the read-out EPG data. For example, in the case where the area necessary for displaying at least one line's worth of program information corresponds to a program information display size of five minutes, it is determined whether or not $Si \geq \{(5/180)\cdot L\}$ is fulfilled. Here, L represents the total of the program display size for a single channel.

Here, in the case where it is determined that a program for which at least one line's worth of program information cannot be displayed is not present ("YES" in step S1404), the procedure advances to step S1405. The processing from steps S1405 to S1408 is the same as the processing from steps S705 to S708 in FIG. 7.

However, in the case where it is determined that a program for which at least one line's worth of program information cannot be displayed is present ("NO" in step S1404), the procedure advances to step S1409. In step S1409, the program having the earliest broadcast time is selected from among these programs. For example, with the example shown in FIG. 15A, the program information display sizes Si calculated for programs 2 and 3 are values less than $\{(5/180)\cdot L\}$. Of these, program 2 has an earlier broadcast time than program 3, and therefore program 2 is selected in step S1409.

Next, in step S1410, it is determined whether or not the program information display size Si of the program broadcasted before the selected program is of a size greater than a single line. In other words, it is determined whether or not $Si > \{(5/180)\cdot L\}$. In the case of FIG. 15A, this determination is carried out for program 1, which is broadcasted before program 2.

In the case where the program information display size Si of the program broadcasted before the selected program is of a size greater than a single line ("YES" in step S1410), the procedure advances to step S1411. However, in the case where the size is not greater than a single line ("NO" in step S1410), the procedure advances to step S1412. Note that in the example in FIG. 15A, program 1, which is before program 2, has a program information display size Si greater than a single line.

In step S1411, the program information display area 604 is obtained/allocated from the previous program so that the program information display size of the selected program takes up one line's worth of space. In the example shown in FIG. 15A, the program information display area 604 is insufficient for program 2 by the amount indicated by $\{(5/180)\cdot L\}-\{(3/180)\cdot L\}=\{(2/180)\cdot L\}$. Therefore, the insufficient amount is obtained from program 1 and allocated to program 2. Here, the memory 1150 is overwritten with the adjusted program information display size values, and the program information display size 1506 is updated.

On the other hand, in step S1412, the program display area is obtained/allocated from the program after the selected program, in an amount capable of displaying one line's worth of information. In the example shown in FIG. 15A, assuming the selected program is program 3, program 4 is chosen as the program thereafter, and the processing is carried out. Here, as before, the memory 1150 is overwritten with the adjusted program information display size values, and the program information display size 1506 is updated.

After adjustment of the program display area 603 in steps S1411 and S1412, the procedure advances to step S1404, and it is once again determined, for all programs, whether or not a program information display area for displaying one line's worth of program information can be secured. The above-mentioned processing is carried out in accordance with the results of this determination, and a final EPG screen is displayed in the display unit 1122.

The details of the program information display size 1506 used in the final EPG screen are as shown in FIG. 15B. As shown in FIG. 15B, the program information display size 1506 of programs 2 and 3 matches $\{(5/180)\cdot L\}$, which is the size for displaying a single line's worth of program information, due to the allocation of the program information display area 604 from programs 1 and 4. In addition, because programs 1 and 4 have allocated parts of their program information display areas 604 to programs 2 and 3 respectively, the program information display sizes 1506 of programs 1 and 4 have decreased compared to the program display size 1505 by the amount of $\{(2/180)\cdot L\}$.

Note that in the present embodiment, a case in which the program information display sizes Si of the programs before and after the selected program are not of a size sufficient for displaying one line's worth of program information can occur. In such a case, the program information display area 604 will be obtained from the following program; however, because the program information display area 604 can be obtained from the program following this following program by once again carrying out the processing from step S1404 on, this poses no problem.

Furthermore, while the minimum number of lines for displaying character information was indicated above as being 1 line, this is not intended to limit the present invention; the number of lines may be an arbitrary number of lines such as, for example, 2 lines. However, setting the minimum number of lines at 1 has an effect that an area for displaying the minimum amount of program information can be secured, with certainty, for programs that would originally have not even a single line displayed.

According to the present embodiment as described thus far, when allocating the program information display area in accordance with the broadcast time of the program, the program information display size can be adjusted and display of the program information made possible for programs for which the program information cannot be sufficiently displayed. Therefore, even information of programs having short broadcast times can be displayed with certainty in the EPG screen, while maintaining a screen display that resembles the format of a conventional EPG screen.

Fourth Embodiment

Thus far, descriptions have been given regarding the arrangement of the program information display area 604; in the first embodiment, the program information display area 604 is distributed evenly among the various programs. Furthermore, in the third embodiment, the program information display area 604 is distributed in accordance with the broadcast time as a general rule; the distribution of the program information display area 604 is adjusted so that at least one line's worth of program information can be displayed for programs having short broadcast times. In addition to these methods, the program information display area 604 may be distributed in accordance with the amount of program information of each program that is to be displayed, such as in the present embodiment. Note that the configuration of the EPG display system including the television device capable of EPG display is the same as in the first embodiment, and thus descriptions thereof shall be omitted.

Figure 16:
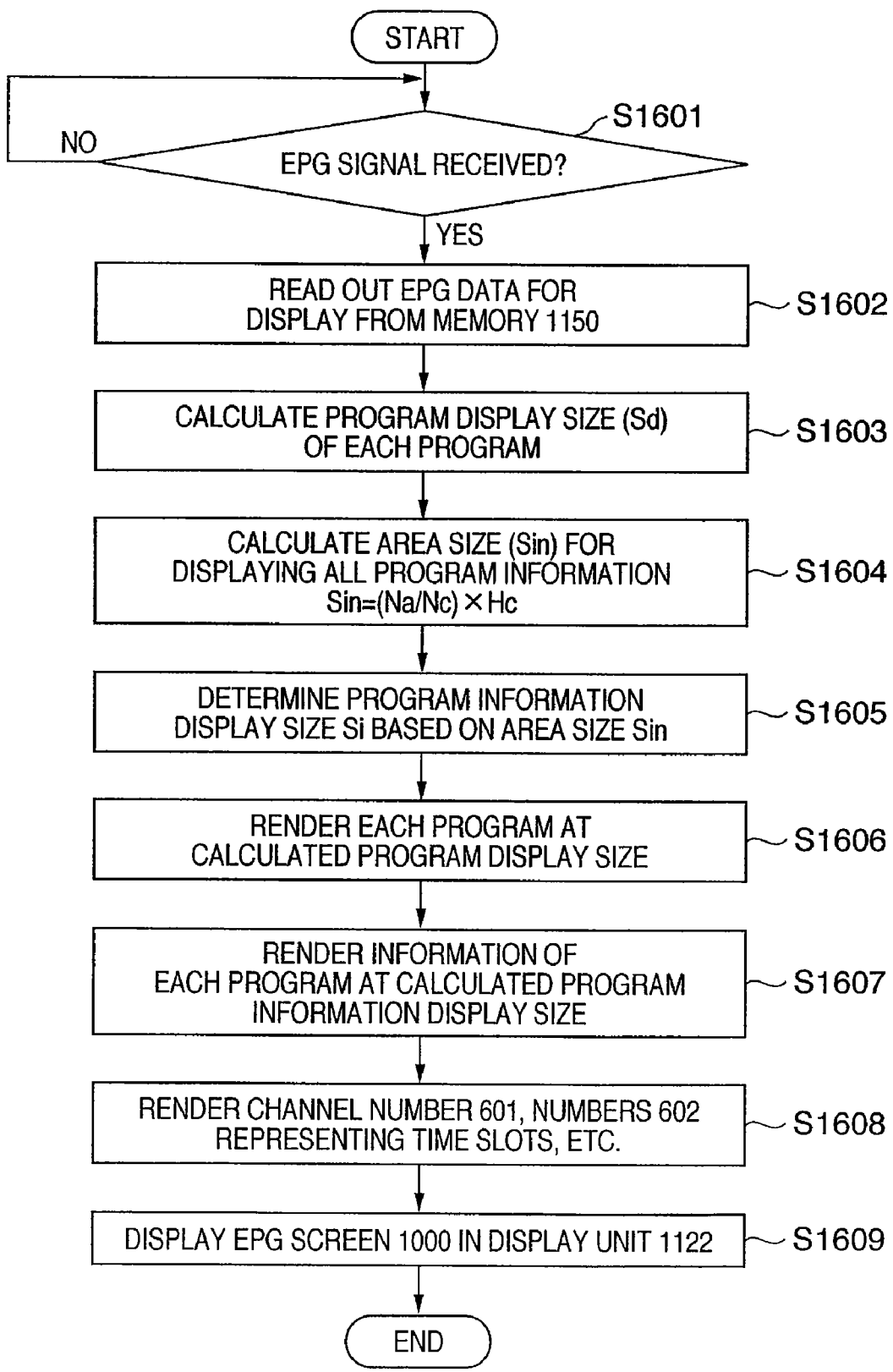
FIG. 16 is a flowchart showing an example of a procedure for carrying out an EPG screen display in a television device 11 according to a fourth embodiment of the present invention.

Processing according to the present embodiment shall be described with reference to FIG. 16. FIG. 16 is a flowchart showing an example of a procedure for carrying out an EPG screen display in the television device 11 according to a fourth embodiment of the present invention.

Note that it is assumed that prior to this processing, the television device 11 receives a broadcast wave when the power is turned on, extracts EPG data from the received broadcast wave, and stores this EPG data in the memory 1150. In addition, when the viewer wishes to browse the EPG screen when viewing a television broadcast, s/he aims the remote controller device 12 in the direction of the television device 11 and depresses the EPG display key 401. Through this, an EPG signal is sent from the data transceiver 305 of the remote controller device 12 and is received by the remote controller receiving unit 1140 of the television device 11.

Steps S1601 to S1603 in FIG. 16 correspond to steps S701 to S703 in FIG. 7, and therefore descriptions thereof shall be omitted from the present embodiment. In step S1604, the size (Sin) of the area necessary for displaying all of the program information within the program information display area 604 is calculated for the programs of the read-out EPG data. Assuming that the number of characters that fit widthwise within the program information display area 604 provided to a single channel is Nc, the height necessary for displaying a single character is Hc, and the number of all characters included in the program information is Na, Sin is found through the following equation: $Sin = (Na/Nc) \times Hc$. Note that any decimals present in the result of calculating Na/Nc are rounded off.

Next, in step S1605, the program information display size Si is determined for each program based on the area size Sin calculated in step S1604. This determination can be performed through, for example, the following method. First, for programs in which the program display size Sd is less than or equal to the area size Sin, the program information display size can be determined assuming Sin=Si. For other programs, the program information display size Si can be determined by evenly distributing the difference between L, which is the total of the program display sizes for a single channel, and the total of the calculated area size Sin.

The processing in steps S1606 to S1609 is the same as the processing in steps S705 to S708 in FIG. 7, and thus descriptions thereof shall be omitted.

Note that the divided display of the program information display area 604 in the above-mentioned second embodiment can be applied in the present embodiment, the first embodiment, and the third embodiment as well. Also, in step S1604, the number of characters in the program information is used as the amount of the program information in the calculation of the area size Sin; however, this is not intended to be limiting, and the data size or the like may be used.

Through this, all program information can be displayed within the program information display area 604, regardless of the length of the broadcast time of the program.

Other Embodiments

Figure 17:
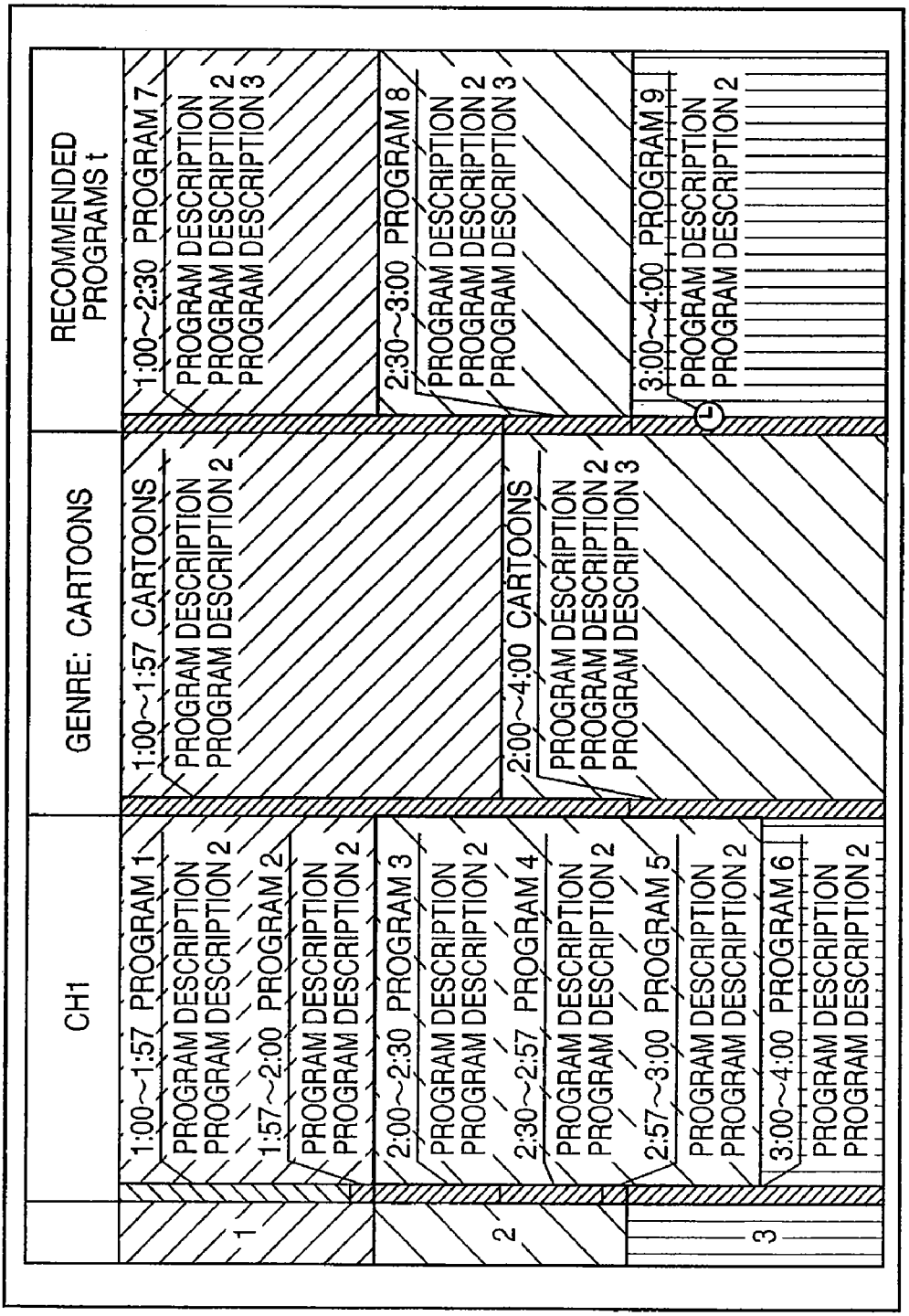
FIG. 17 is a diagram showing an example of an EPG screen according to another embodiment of the present invention.

In the above embodiments, there are cases where the position in which the program information display area is arranged does not necessarily match the display of the broadcast time slots 602 and the start times, broadcast time slots, and the like are difficult to identify. Accordingly, the program display area 603 and the program information display area 604 can be displayed in different colors in accordance with the start times, broadcast time slots, and the like, as shown in FIG. 17. Doing so makes it possible to greatly improve the visibility of the broadcast time slot of the program. It is also possible to carry out a display in which specific programs are arranged by genre, rather than simply by channel.

Figure 18:
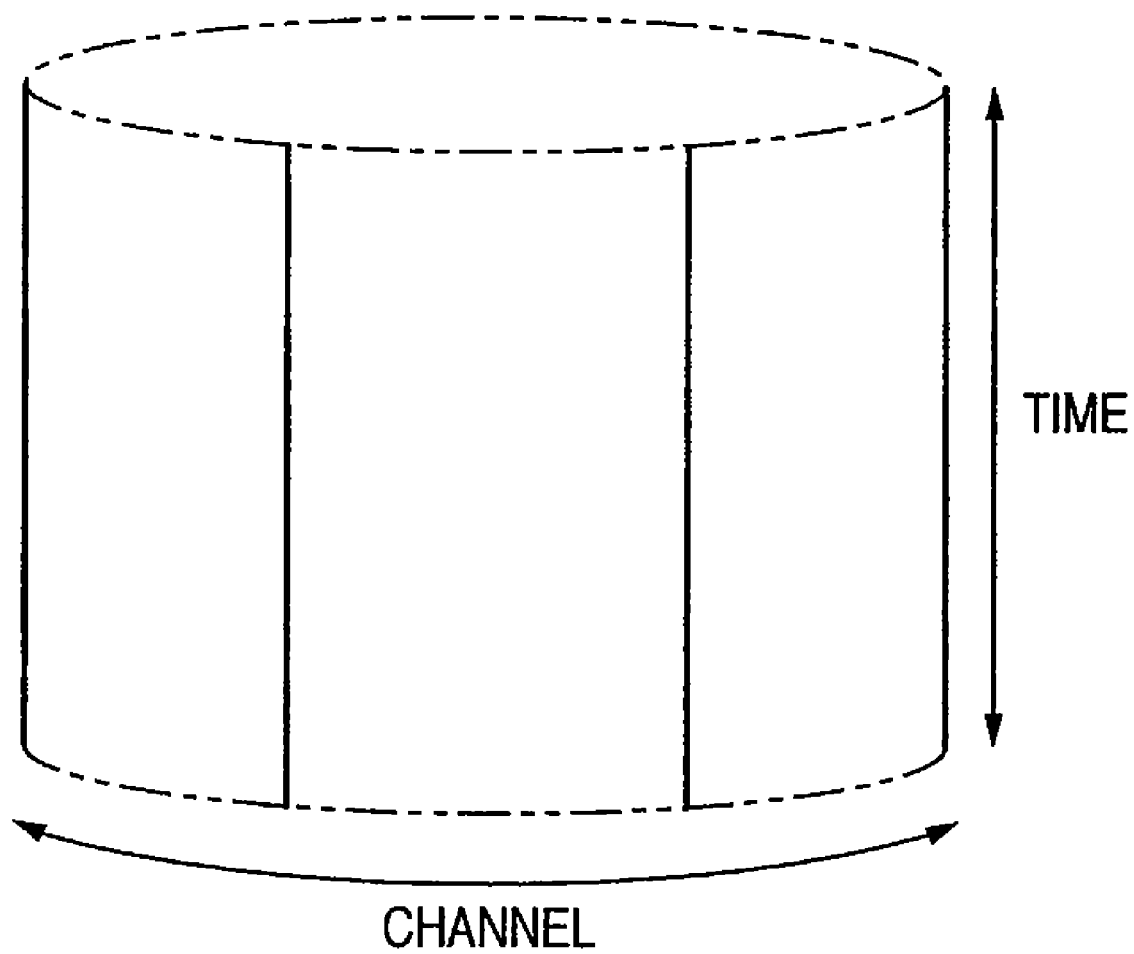
FIG. 18 is a diagram showing an example of an EPG screen according to yet another embodiment of the present invention.

Furthermore, in the above embodiments, the display is carried out with the channels arranged side by side, as shown in FIG. 6; however, a three-dimensional, cylindrical display, in which selecting channels to the right and left rotates the display, is also possible, as shown in FIG. 18. Through this, it is possible to display programs in the center at a comparatively larger size, while displaying other programs on the sides at comparatively smaller sizes, thereby improving the visibility, as compared to the conventional EPG that has a simple side by side arrangement. In addition, rotating the display when performing right and left operations provides an improved sense of operability as compared to conventional right and left operations.

Further still, the EPG data used in the above embodiments is generated from a broadcast wave of a digital broadcast; however, the present invention can also be realized using data obtained from an Internet television guide, a program guide service, or the like.

Note that the present invention can be applied to an apparatus comprising a single device or to a system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-289195, filed Oct. 24, 2006, which is hereby incorporated by reference herein in its entirety.

What is claimed is:

1. An electronic program guide (EPG) generation apparatus that generates an EPG, the apparatus comprising:
   an information acquisition unit configured to acquire information regarding each program to be displayed in the EPG;
   a first determination unit configured to determine the size of a first display area representing the broadcast times of each program in the EPG, based on information regarding the broadcast times of each program included in the information regarding each program;
   a second determination unit configured to determine the size of a second display area for displaying, in the EPG, information regarding details of each program included in the information regarding each program except for first program and last program in the same channel, based on the size of the first display area of the program and of a program to be broadcasted before and a program to be broadcasted after that program in the same channel; and
   a display controller configured to control the display, on a display unit, of the EPG based on the sizes of the first and second display areas, determined by the first and second determination unit,
   wherein the display controller configures a first column based on the first display area, and a second column and third column based on the second display area, along the time-axis direction of the EPG, arranges the first, second, and third columns adjacent to one another so that the first column is positioned between the second and third columns, and causes the EPG to be displayed, for each channel that broadcasts a program.

2. An electronic program guide (EPG) generation apparatus that generates an EPG, the apparatus comprising:
   an information acquisition means for acquiring information regarding each program to be displayed in the EPG;
   a first determination means for determining the size of a first display area representing the broadcast times of each program in the EPG, based on information regarding the broadcast times of each program included in the information regarding each program;
   a second determination means for determining the size of a second display area for displaying, in the EPG, information regarding details of each program included in the information regarding each program except for first program and last program in the same channel, based on the size of the first display area of the program and of a program to be broadcasted before and a program to be broadcasted after that program in the same channel; and
   a display controller for controlling the display, on a display means, of the EPG based on the sizes of the first and second display areas, determined by the first and second determination means,
   wherein the display controller configures a first column based on the first display area, and a second column and third column based on the second display area, along the time-axis direction of the EPG, arranges the first, second, and third columns adjacent to one another so that the first column is positioned between the second and third columns, and causes the EPG to be displayed, for each channel that broadcasts a program.

3. An electronic program guide (EPG) generation method for generating an EPG, the method comprising:
   acquiring information regarding each program to be displayed in the EPG;
   determining the size of a first display area representing the broadcast times of each program in the EPG, based on information regarding the broadcast times of each program included in the information regarding each program;
   determining the size of a second display area for displaying, in the EPG, information regarding details of each program included in the information regarding each program except for first program and last program in the same channel, based on the size of the first display area of the program and of a program to be broadcasted before and a program to be broadcasted after that program in the same channel; and
   controlling the display, on a display means, of the EPG based on the determined sizes of the first and second display areas
   wherein the display controller configures a first column based on the first display area, and a second column and third column based on the second display area, along the time-axis direction of the EPG, arranges the first, second, and third columns adjacent to one another so that the first column is positioned between the second and third columns, and causes the EPG to be displayed, for each channel that broadcasts a program.

4. A non-transitory computer readable storage medium storing a program which, when executed on a computer causes the computer to perform an electronic program guide (EPG) generation method comprising:
   acquiring information regarding each program to be displayed in the EPG;
   determining the size of a first display area representing the broadcast times of each program in the EPG, based on information regarding the broadcast times of each program included in the information regarding each program;
   determining the size of a second display area for displaying, in the EPG, information regarding details of each program included in the information regarding each program except for first program and last program in the same channel, based on the size of the first display area of the program and of a program to be broadcasted before and a program to be broadcasted after that program in the same channel; and
   controlling the display, on a display means, of the EPG based on the determined sizes of the first and second display areas,
   wherein the display controller configures a first column based on the first display area, and a second column and third column based on the second display area, along the time-axis direction of the EPG, arranges the first, second, and third columns adjacent to one another so that the first column is positioned between the second and third columns, and causes the EPG to be displayed, for each channel that broadcasts a program.

5. An EPG generation apparatus according to claim 1, wherein the second determination unit determines the size of the second display area for each program except for first program and last program in the same channel according to the following equation:

(the size of the first display area of the program)+{(the size of the first display area of a program before that program)+(the size of the first display area of a program after that program)}/2.

6. An EPG generation apparatus according to claim 1, wherein the second determination unit determines the size of the second display area for the first program in the same channel according to the following equation:

(the size of the first display area of the program)+(the size of the first display area of a program after that program)/2.

7. An EPG generation apparatus according to claim 1, wherein the second determination unit determines the size of the second display area for the last program in the same channel according to the following equation:

(the size of the first display area of the program)+(the size of the first display area of a program before that program)/2.

8. An EPG generation method according to claim 3, wherein the size of the second display area is determined for each program except for first program and last program in the same channel according to the following equation:

(the size of the first display area of the program)+{(the size of the first display area of a program before that program)+(the size of the first display area of a program after that program)}/2.

9. An EPG generation method according to claim 3, wherein the size of the second display area is determined for the first program in the same channel according to the following equation:

(the size of the first display area of the program)+(the size of the first display area of a program after that program)/2.

10. An EPG generation method according to claim 3, wherein the size of the second display area is determined for the last program in the same channel according to the following equation:

(the size of the first display area of the program)+(the size of the first display area of a program before that program)/2.

* * * * *